United States Patent
Lettow et al.

(10) Patent No.: US 9,731,540 B2
(45) Date of Patent: Aug. 15, 2017

(54) SECURITY DEVICES

(75) Inventors: John S. Lettow, Washington, DC (US); Dan Scheffer, Frederick, MD (US)

(73) Assignee: VORBECK MATERIALS CORP.

(*) Notice: Subject to any disclaimer, the term of this patent is extended or adjusted under 35 U.S.C. 154(b) by 0 days.

(21) Appl. No.: 13/885,673

(22) PCT Filed: Nov. 15, 2011

(86) PCT No.: PCT/US2011/060878
§ 371 (c)(1),
(2), (4) Date: Oct. 28, 2013

(87) PCT Pub. No.: WO2012/068177
PCT Pub. Date: May 24, 2012

(65) Prior Publication Data
US 2014/0145426 A1  May 29, 2014

Related U.S. Application Data (60) Provisional application No. 61/413,968, filed on Nov. 15, 2010.

(51) Int. Cl.
| | | |
|---|---|---|
| *B42D 25/00* | (2014.01) | |
| *B42D 25/373* | (2014.01) | |
| *B42D 25/21* | (2014.01) | |
| *B42D 25/45* | (2014.01) | |
| *B82Y 30/00* | (2011.01) | |
| *B42D 15/00* | (2006.01) | |
| *B42D 25/29* | (2014.01) | |

(52) U.S. Cl.
CPC ....... *B42D 25/373* (2014.10); *B42D 15/0073* (2013.01); *B42D 25/00* (2014.10); *B42D 25/21* (2014.10); *B42D 25/29* (2014.10); *B42D 25/45* (2014.10); *B82Y 30/00* (2013.01); *B42D 2033/20* (2013.01)

(58) Field of Classification Search
CPC .......................... B42D 25/373; B42D 2033/00
USPC .......................................................... 283/83
See application file for complete search history.

(56) References Cited

U.S. PATENT DOCUMENTS

| 6,118,377 A  * | 9/2000 | Bonkowski et al. ........ 283/83 |
| 2007/0092432 A1* | 4/2007 | Prud'Homme et al. ...... 423/448 |
| 2012/0142832 A1* | 6/2012 | Varma ...................... C09D 5/24 |
| | | 252/511 |

FOREIGN PATENT DOCUMENTS

WO   WO 2010115173 A1 * 10/2010 ............... C09D 5/24

* cited by examiner

*Primary Examiner* — Kyle Grabowski
(74) *Attorney, Agent, or Firm* — Trentice V. Bolar, Esq.

(57) ABSTRACT

Multilayered security devices comprising a patterned substrate over which a graphene-based coating has been applied.

15 Claims, 3 Drawing Sheets

SECURITY DEVICES

REFERENCE TO RELATED APPLICATIONS

The present application claims priority to U.S. Provisional Application 61/413,968, filed on Nov. 15, 2010, the entire contents of which are hereby incorporated by reference.

FIELD OF THE INVENTION

The present invention relates to security devices prepared by coating an imaged substrate with a composition comprising graphene sheets.

BACKGROUND

The protection of a wide range of material goods and documents from tampering, fraud, counterfeiting, theft, etc. is of rapidly growing concern. Counterfeit products, for example, can not only lead to lost revenues for the producers of the genuine goods, but can also cause significant health and safety risks. Counterfeit pharmaceuticals, for example, can be difficult to detect without the right authentication methods. Furthermore, there is a need to be able to effectively track goods as they are transported and used. Many solutions for these problems use expensive or elaborate solutions, many of which are "overt" (i.e. the presence of the security feature is clearly visible to the observer). It would be desirable to obtain a security device that can have multiple levels of security, can be simple and inexpensive to make and operate, and that can be covert (i.e., an uninitiated viewer will not necessarily know that it is present).

SUMMARY OF THE INVENTION

Disclosed and claimed herein is a multilayered security device, comprising a first layer comprising a patterned substrate and a second layer overlying the pattern, comprising a coating composition comprising graphene sheets. Also disclosed and claimed is a method of making a multilayered security device, comprising applying a coating composition comprising graphene sheets to a patterned substrate.

DETAILED DESCRIPTION OF THE INVENTION

The security device of the application comprises a multilayered article comprising a substrate that has been imaged with a pattern (referred to herein as the "image") over which is applied a coating composition comprising graphene sheets to give a coated surface. The portions of the coated surface over the pattern have different properties from the portions of the coated surface over un-imaged portions of the substrate (referred to as "background areas"). The imaged substrate may or may not have any background areas. The substrate can also be imaged in such a way that portions of the coated surface have different properties over different parts of the pattern. The properties can include one or more of electrical or thermal conductivity, optical properties (such as optical density, color coordinates, etc.), X-ray diffraction (XRD) pattern, etc.

The security device can be used to hide or disguise unique patterns and codes that can only be read, and in some cases, detected, by following specific methods.

Figure 1A:
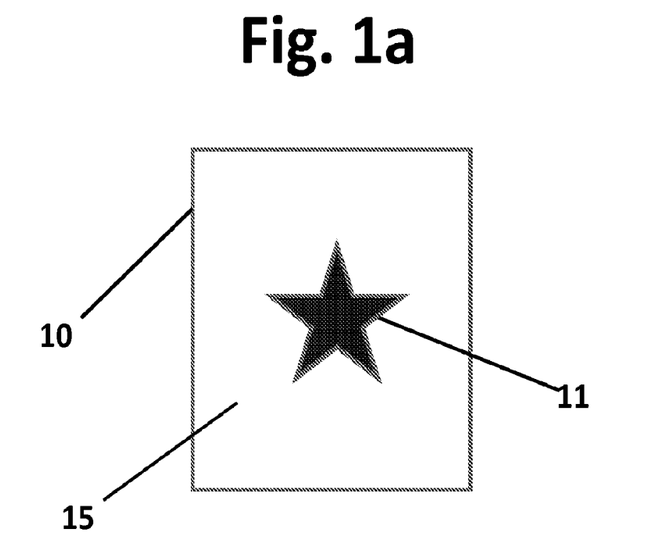
FIG. 1a shows a patterned substrate.
Figure 1B:
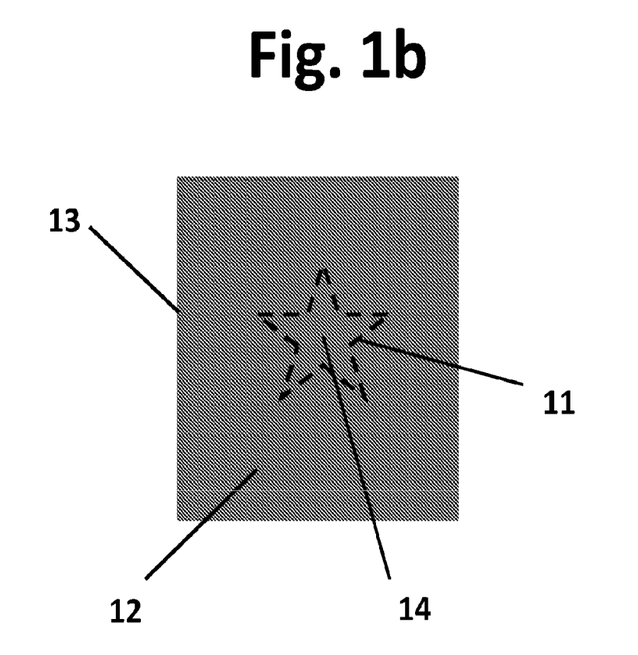
FIG. 1b shows a security device comprising a patterned substrate coated with a graphene-based coating composition.

For example, FIG. 1a shows a patterned substrate 10 that has been imaged with a pattern 11, leaving a background area 15. FIG. 1b shows a security device 13 made by coating the patterned substrate 10 with a coating 12, which also covers pattern 11. The portion 14 of the coating that covers the image 11 has different properties from the portion of the coating that lies over the background area 15.

Figure 2A:
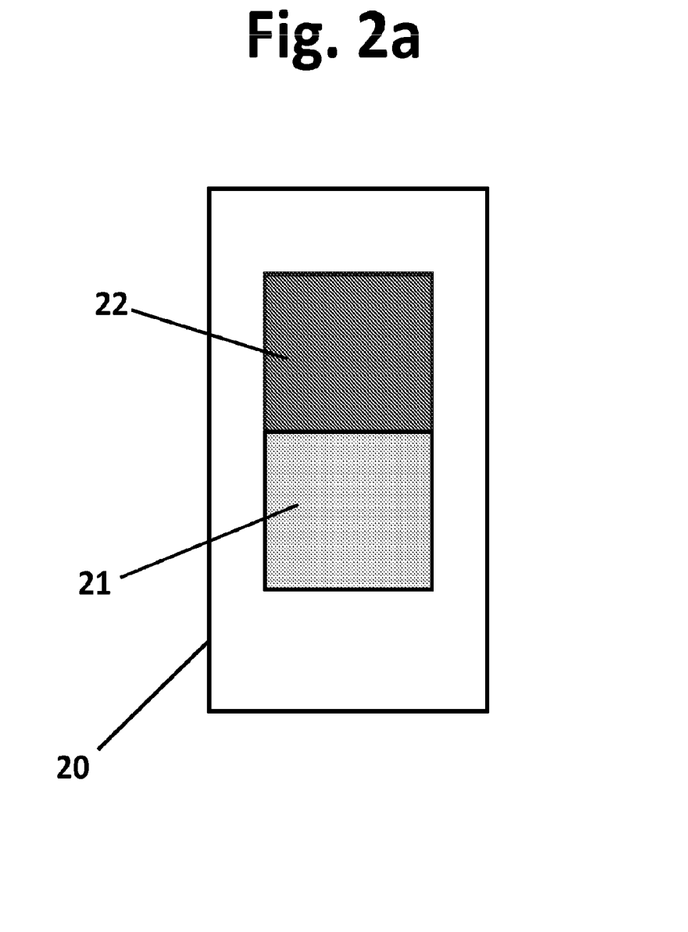
FIG. 2a shows a patterned substrate where the pattern contains lighter and darker regions.
Figure 2B:
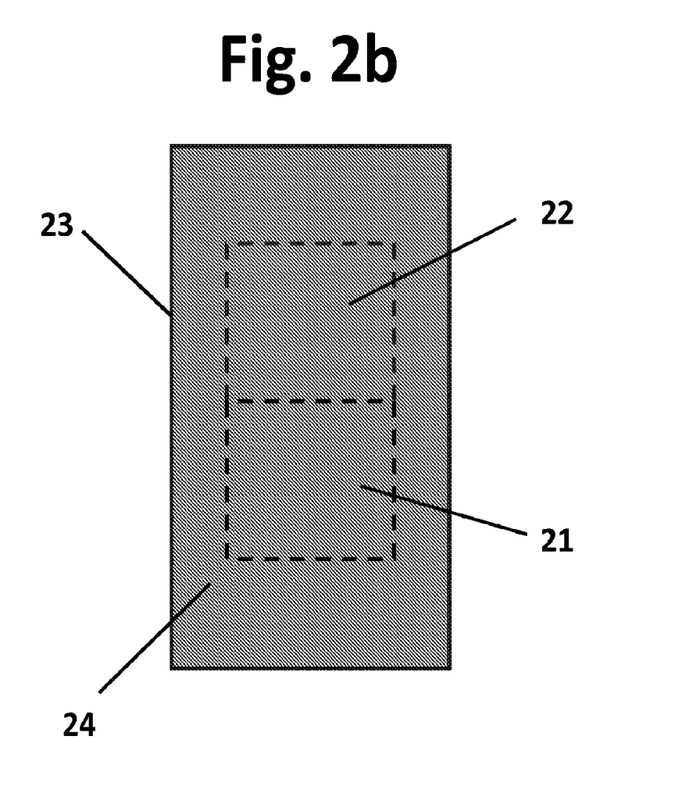
FIG. 2b shows a a security device comprising a patterned substrate where the pattern contains lighter and darker regions that has been coated with a graphene-based coating composition.

FIG. 2a shows a patterned substrate 20 that has been imaged with a pattern containing a lighter portion 21 and a darker portion 22. FIG. 2b shows a security device 23 made by coating the patterned substrate 20 with a coating 24 that also covers portions 21 and 22 of the pattern. The areas of the coating covering portions 21 and 22 can have different properties from each other and from the portions of the coating covering the background area.

Some or all of the image can be visible through the coating. In another embodiment, at least a portion or all of the image can be difficult or not possible to detect visually through the coating. The opacity, color coordinates, and other optical properties of the coating and/or the pattern can be adjusted to achieve a desired degree of visibility of the pattern through the coating.

The coated image can have different properties from the background area and different portions of the coated image can have different properties from each other.

The coating composition comprises graphene sheets, and, optionally, at least one binder, at least one carrier, one or more functional additives to adjust the optical properties, conductivity, XRD pattern, or other properties of the coating, and/or one or more additional additives. Functional additives can include electrochromic, photochromic, phosphorescent, fluororescent, pearlescent, thermochromic, metallic, and metallic effect pigments, glitter, UV/IR blockers, etc.

There are no particular limitations to the form taken by the substrate. Substrates include, but are not limited to, flexible and/or stretchable materials, silicones and other elastomers and other polymeric materials, metals (such as aluminum, copper, steel, stainless steel, etc.), adhesives, fabrics (including cloths) and textiles (such as cotton, wool, polyesters, rayon, etc.), clothing, glasses and other minerals, ceramics, silicon surfaces, wood, paper, cardboard, paperboard, cellulose-based materials, glassine, labels, silicon and other semiconductors, laminates, corrugated materials, concrete, bricks, and other building materials, etc. Substrates can in the form of films, papers, wafers, larger three-dimensional objects, etc.

The substrates can have been treated with other materials before the images are applied. Examples include substrates (such as PET) coated with indium tin oxide, antimony tin oxide, etc. They can be woven, nonwoven, in mesh form; etc.

The substrates can be paper-based materials generally (including paper, paperboard, cardboard, glassine, etc.). Paper-based materials can be surface treated. Examples of surface treatments include coatings such as polymeric coatings, which can include PET, polyethylene, polypropylene, acetates, nitrocellulose, etc. Coatings can be adhesives. The paper based materials can be of sized.

Examples of polymeric materials include, but are not limited to, those comprising thermoplastics and thermosets, including elastomers and rubbers (including thermoplastics and thermosets), silicones, fluorinated polysiloxanes, natural rubber, butyl rubber, chlorosulfonated polyethylene, chlorinated polyethylene, styrene/butadiene copolymers (SBR), styrene/ethylene/butadiene/stryene copolymers (SEBS), styrene/ethylene/butadiene/stryene copolymers grafted with maleic anhydride, styrene/isoprene/styrene copolymers (SIS), polyisoprene, nitrile rubbers, hydrogenated nitrile rubbers, neoprene, ethylene/propylene copolymers (EPR), ethylene/propylene/diene copolymers (EPDM), ethylene/vinyl acetate copolymer (EVA), hexafluoropropylene/vinylidene fluoride/tetrafluoroethylene copolymers, tetrafluoroethylene/propylene copolymers, fluorelastomers, polyesters (such as poly(ethylene terephthalate), poly(butylene terephthalate), poly(ethylene naphthalate), liquid crystalline polyesters, poly(lactic acid), etc.); polystyrene; polyamides (including polyterephthalamides); polyimides (such as Kapton®); aramids (such as Kevlar® and Nomex®); fluoropolymers (such as fluorinated ethylene propylene (FEP), polytetrafluoroethylene (PTFE), poly(vinyl fluoride), poly(vinylidene fluoride), etc.); polyetherimides; poly(vinyl chloride); poly(vinylidene chloride); polyurethanes (such as thermoplastic polyurethanes (TPU); spandex, cellulosic polymers (such as nitrocellulose, cellulose acetate, etc.); styrene/acrylonitriles polymers (SAN); arcrylonitrile/butadiene/styrene polymers (ABS); polycarbonates; polyacrylates; poly(methyl methacrylate); ethylene/vinyl acetate copolymers; thermoset epoxies and polyurethanes; polyolefins (such as polyethylene (including low density polyethylene, high density polyethylene, ultrahigh molecular weight polyethylene, etc.), polypropylene (such as biaxially-oriented polypropylene, etc.); Mylar; etc. They can be non-woven materials, such as DuPont Tyvek®. They can be adhesive or adhesive-backed materials (such as adhesive-backed papers or paper substitutes). They can be mineral-based paper substitutes such as Teslin® from PPG Industries. The substrate can be a transparent or translucent or optical material, such as glass, quartz, polymer (such as polycarbonate or poly(meth)acrylates (such as poly(methyl methacrylate).

Examples of substrates include packaging material, currency, financial instruments, etc.

The pattern and coating composition can be applied using any suitable method, including, but not limited to, painting, coating, printing, pouring, spin casting, solution casting, dip coating, powder coating, by syringe or pipette, spray coating, curtain coating, lamination, co-extrusion, electrospray deposition, ink-jet printing, spin coating, thermal transfer (including laser transfer) methods, doctor blade printing, wire rod printing, screen printing, rotary screen printing, gravure printing, lithographic printing, intaglio printing, digital printing, capillary printing, offset printing, microprinting, electrohydrodynamic (EHD) printing (a method of which is described in WO 2007/053621, which is hereby incorporated herein by reference), flexographic printing, pad printing, stamping, tampon printing, pad printing, stencil, wire rod, xerography, microcontact printing, dip pen nanolithography, laser printing, drawing, writing, coloring, via pen, or similar means, etc. The pattern and/or coating composition can be applied in multiple layers or via multiple passes or multiple methods.

The pattern can be made from any suitable medium including, but not limited to, paints, inks, varnishes, toners and other solid or powder-based printing media, inkjet inks, water-based inks and coatings, solvent based inks and coatings, graphic inks, UV-cured inks, flexographic inks, screen inks, offset inks, gravure inks, pencils and pens, chalk and other minerals, crayons, markers (e.g. felt tip pens, permanent markers, magic markers, highlighters, Sharpies, etc.), waxes, etc. In some embodiments, the media can use carbon-based dyes and/or pigments, colored dyes and/or pigments, materials that are pigment/dye-free, materials that are binder-free, etc. Two or more media can be used and may overlap each other.

The pattern and overcoating can take on any form. They can be continuous or amorphous, in the form of designs, shapes, lines, characters (such as letters, numbers, symbols, etc.), lines, bar codes (including two-dimensional and three-dimensional bar codes, etc.), arbitrary designs and patterns, etc. They can have a uniform or non-uniform thickness. The overcoating may be applied such that it covers some or all of the image and little to none of the background areas.

The presence of the underlying pattern can be detected by a user using methods such as measuring electrical and/or thermal conductivity, optical density, color coordinates, XRD patterns, etc. A variety of devices, including handheld, wireless, etc. devices can be used. Any suitable color coordinates system (such as Lab) can be used.

In some embodiments, if the pattern is formed using different densities and/or thicknesses of a coating, ink, toner, etc. in different areas of the pattern, the coated surface can have different properties. If the pattern is formed using different coatings, inks, toners, etc. in different areas of the pattern, the coated surface can have different properties in those areas. The variable properties in different portions of the pattern can be used to create a distinctive signature in the security device and provide an additional layer of security.

The graphene sheets are graphite sheets preferably having a surface area of from about 100 to about 2630 $m^2/g$. In some embodiments, the graphene sheets primarily, almost completely, or completely comprise fully exfoliated single sheets of graphite (these are approximately 1 nm thick and are often referred to as "graphene"), while in other embodiments, at least a portion of the graphene sheets can comprise at partially exfoliated graphite sheets, in which two or more sheets of graphite have not been exfoliated from each other. The graphene sheets can comprise mixtures of fully and partially exfoliated graphite sheets.

Graphene sheets are distinct from carbon nanotubes. Graphene sheets can have a "platey" (e.g. two-dimensional) structure and do not have the needle-like form of carbon nanotubes. The two longest dimensions of the graphene sheets may each be at least 50 times greater than the shortest dimension (i.e. thickness) of the sheets.

Graphene sheets can be made using any suitable method. For example, they can be obtained from graphite, graphite oxide, expandable graphite, expanded graphite, etc. They can be obtained by the physical exfoliation of graphite, by for example, peeling off sheets graphene sheets. They can be made from inorganic precursors, such as silicon carbide. They can be made by chemical vapor deposition (such as by reacting a methane and hydrogen on a metal surface). They can be made by the reduction of an alcohol, such ethanol, with a metal (such as an alkali metal like sodium) and the subsequent pyrolysis of the alkoxide product (such a method is reported in *Nature Nanotechnology* (2009), 4, 30-33). They can be made by the exfoliation of graphite in dispersions or exfoliation of graphite oxide in dispersions and the subsequently reducing the exfoliated graphite oxide. Graphene sheets can be made by the exfoliation of expandable graphite, followed by intercalation, and ultrasonication or other means of separating the intercalated sheets (see, for example, *Nature Nanotechnology* (2008), 3, 538-542). They can be made by the intercalation of graphite and the subsequent exfoliation of the product in suspension, thermally, etc.

Graphene sheets can be made from graphite oxide (also known as graphitic acid or graphene oxide). Graphite can be treated with oxidizing and/or intercalating agents and exfoliated. Graphite can also be treated with intercalating agents and electrochemically oxidized and exfoliated. Graphene sheets can be formed by ultrasonically exfoliating suspensions of graphite and/or graphite oxide in a liquid (which can contain surfactants and/or intercalants). Exfoliated graphite oxide dispersions or suspensions can be subsequently reduced to graphene sheets. Graphene sheets can also be formed by mechanical treatment (such as grinding or milling) to exfoliate graphite or graphite oxide (which would subsequently be reduced to graphene sheets).

Reduction of graphite oxide to graphene can be by means of chemical reduction and can be carried out in graphite oxide in a solid form, in a dispersion, etc. Examples of useful chemical reducing agents include, but are not limited to, hydrazines (such as hydrazine, N,N-dimethylhydrazine, etc.), sodium borohydride, citric acid, hydroquinone, isocyanates (such as phenyl isocyanate), hydrogen, hydrogen plasma, etc. A dispersion or suspension of exfoliated graphite oxide in a carrier (such as water, organic solvents, or a mixture of solvents) can be made using any suitable method (such as ultrasonication and/or mechanical grinding or milling) and reduced to graphene sheets.

Graphite oxide can be produced by any method known in the art, such as by a process that involves oxidation of graphite using one or more chemical oxidizing agents and, optionally, intercalating agents such as sulfuric acid. Examples of oxidizing agents include nitric acid, sodium and potassium nitrates, perchlorates, hydrogen peroxide, sodium and potassium permanganates, phosphorus pentoxide, bisulfites, etc. Preferred oxidants include $KClO_4$; $HNO_3$ and $KClO_3$; $KMnO_4$ and/or $NaMnO_4$; $KMnO_4$ and $NaNO_3$; $K_2S_2O_8$ and $P_2O_5$ and $KMnO_4$; $KMnO_4$ and $HNO_3$; and $HNO_3$. Preferred intercalation agents include sulfuric acid. Graphite can also be treated with intercalating agents and electrochemically oxidized. Examples of methods of making graphite oxide include those described by Staudenmaier (*Ber. Stsch. Chem. Ges.* (1898), 31, 1481) and Hummers (*J. Am. Chem. Soc.* (1958), 80, 1339).

One example of a method for the preparation of graphene sheets is to oxidize graphite to graphite oxide, which is then thermally exfoliated to form graphene sheets (also known as thermally exfoliated graphite oxide), as described in US patent application publication 2007/0092432, the disclosure of which is incorporated herein by reference. The thusly formed graphene sheets can display little or no signature corresponding to graphite or graphite oxide in their X-ray diffraction pattern.

The thermal exfoliation can be carried out in a continuous, semi-continuous batch, etc. process.

Heating can be done in a batch process or a continuous process and can be done under a variety of atmospheres, including inert and reducing atmospheres (such as nitrogen, argon, and/or hydrogen atmospheres). Heating times can range from under a few seconds or several hours or more, depending on the temperatures used and the characteristics desired in the final thermally exfoliated graphite oxide. Heating can be done in any appropriate vessel, such as a fused silica, mineral, metal, carbon (such as graphite), ceramic, etc. vessel. Heating can be done using a flash lamp.

During heating, the graphite oxide can be contained in an essentially constant location in single batch reaction vessel, or can be transported through one or more vessels during the reaction in a continuous or batch mode. Heating can be done using any suitable means, including the use of furnaces and infrared heaters.

Examples of temperatures at which the thermal exfoliation of graphite oxide can be carried out are at least about 300° C., at least about 400° C., at least about 450° C., at least about 500° C., at least about 600° C., at least about 700° C., at least about 750° C., at least about 800° C., at least about 850° C., at least about 900° C., at least about 950° C., and at least about 1000° C. Preferred ranges include between about 750 and about 3000° C., between about 850 and about 2500° C., between about 950 and about 2500° C., and between about 950 and about 1500° C.

The time of heating can range from less than a second to many minutes. For example, the time of heating can be less than about 0.5 seconds, less than about 1 second, less than about 5 seconds, less than about 10 seconds, less than about 20 seconds, less than about 30 seconds, or less than about 1 min. The time of heating can be at least about 1 minute, at least about 2 minutes, at least about 5 minutes, at least about 15 minutes, at least about 30 minutes, at least about 45 minutes, at least about 60 minutes, at least about 90 minutes, at least about 120 minutes, at least about 150 minutes, at least about 240 minutes, from about 0.01 seconds to about 240 minutes, from about 0.5 seconds to about 240 minutes, from about 1 second to about 240 minutes, from about 1 minute to about 240 minutes, from about 0.01 seconds to about 60 minutes, from about 0.5 seconds to about 60 minutes, from about 1 second to about 60 minutes, from about 1 minute to about 60 minutes, from about 0.01 seconds to about 10 minutes, from about 0.5 seconds to about 10 minutes, from about 1 second to about 10 minutes, from about 1 minute to about 10 minutes, from about 0.01 seconds to about 1 minute, from about 0.5 seconds to about 1 minute, from about 1 second to about 1 minute, no more than about 600 minutes, no more than about 450 minutes, no more than about 300 minutes, no more than about 180 minutes, no more than about 120 minutes, no more than about 90 minutes, no more than about 60 minutes, no more than about 30 minutes, no more than about 15 minutes, no more than about 10 minutes, no more than about 5 minutes, no more than about 1 minute, no more than about 30 seconds, no more than about 10 seconds, or no more than about 1 second. During the course of heating, the temperature can vary.

Examples of the rate of heating include at least about 120° C./min, at least about 200° C./min, at least about 300° C./min, at least about 400° C./min, at least about 600° C./min, at least about 800° C./min, at least about 1000° C./min, at least about 1200° C./min, at least about 1500° C./min, at least about 1800° C./min, and at least about 2000° C./min.

Graphene sheets can be annealed or reduced to graphene sheets having higher carbon to oxygen ratios by heating under reducing atmospheric conditions (e.g., in systems purged with inert gases or hydrogen). Reduction/annealing temperatures are preferably at least about 300° C., or at least about 350° C., or at least about 400° C., or at least about 500° C., or at least about 600° C., or at least about 750° C., or at least about 850° C., or at least about 950° C., or at least about 1000° C. The temperature used can be, for example, between about 750 and about 3000° C., or between about 850 and about 2500° C., or between about 950 and about 2500° C.

The time of heating can be for example, at least about 1 second, or at least about 10 seconds, or at least about 1 minute, or at least about 2 minutes, or at least about 5 minutes. In some embodiments, the heating time will be at least about 15 minutes, or about 30 minutes, or about 45 minutes, or about 60 minutes, or about 90 minutes, or about 120 minutes, or about 150 minutes. During the course of annealing/reduction, the temperature can vary within these ranges.

The heating can be done under a variety of conditions, including in an inert atmosphere (such as argon or nitrogen) or a reducing atmosphere, such as hydrogen (including hydrogen diluted in an inert gas such as argon or nitrogen), or under vacuum. The heating can be done in any appropriate vessel, such as a fused silica or a mineral or ceramic vessel or a metal vessel. The materials being heated including any starting materials and any products or intermediates) can be contained in an essentially constant location in single batch reaction vessel, or can be transported through one or more vessels during the reaction in a continuous or batch reaction. Heating can be done using any suitable means, including the use of furnaces and infrared heaters.

The graphene sheets preferably have a surface area of at least about 100 $m^2/g$ to, or of at least about 200 $m^2/g$, or of at least about 300 $m^2/g$, or of at least about 350 $m^2/g$, or of at least about 400 $m^2/g$, or of at least about 500 $m^2/g$, or of at least about 600 $m^2/g$, or of at least about 700 $m^2/g$, or of at least about 800 $m^2/g$, or of at least about 900 $m^2/g$, or of at least about 700 $m^2/g$. The surface area can be about 400 to about 1100 $m^2/g$. The theoretical maximum surface area can be calculated to be 2630 $m^2/g$. The surface area includes all values and subvalues therebetween, especially including 400, 500, 600, 700, 800, 900, 1000, 1100, 1200, 1300, 1400, 1500, 1600, 1700, 1800, 1900, 2000, 2100, 2200, 2300, 2400, 2500, and 2630 $m^2/g$.

The graphene sheets can have number average aspect ratios of about 100 to about 100,000, or of about 100 to about 50,000, or of about 100 to about 25,000, or of about 100 to about 10,000 (where "aspect ratio" is defined as the ratio of the longest dimension of the sheet to the shortest).

Surface area can be measured using either the nitrogen adsorption/BET method at 77 K or a methylene blue (MB) dye method in liquid solution.

The dye method is carried out as follows: A known amount of graphene sheets is added to a flask. At least 1.5 g of MB are then added to the flask per gram of graphene sheets. Ethanol is added to the flask and the mixture is ultrasonicated for about fifteen minutes. The ethanol is then evaporated and a known quantity of water is added to the flask to re-dissolve the free MB. The undissolved material is allowed to settle, preferably by centrifuging the sample. The concentration of MB in solution is determined using a UV-vis spectrophotometer by measuring the absorption at $\lambda_{max}$=298 nm relative to that of standard concentrations.

The difference between the amount of MB that was initially added and the amount present in solution as determined by UV-vis spectrophotometry is assumed to be the amount of MB that has been adsorbed onto the surface of the graphene sheets. The surface area of the graphene sheets are then calculated using a value of 2.54 $m^2$ of surface covered per one mg of MB adsorbed.

The graphene sheets can have a bulk density of from about 0.01 to at least about 200 kg/$m^3$. The bulk density includes all values and subvalues therebetween, especially including 0.05, 0.1, 0.5, 1, 5, 10, 15, 20, 25, 30, 35, 50, 75, 100, 125, 150, and 175 kg/$m^3$.

The graphene sheets can be functionalized with, for example, oxygen-containing functional groups (including, for example, hydroxyl, carboxyl, and epoxy groups) and typically have an overall carbon to oxygen molar ratio (C/O ratio), as determined by elemental analysis of at least about 1:1, or more preferably, at least about 3:2. Examples of carbon to oxygen ratios include about 3:2 to about 85:15; about 3:2 to about 20:1; about 3:2 to about 30:1; about 3:2 to about 40:1; about 3:2 to about 60:1; about 3:2 to about 80:1; about 3:2 to about 100:1; about 3:2 to about 200:1; about 3:2 to about 500:1; about 3:2 to about 1000:1; about 3:2 to greater than 1000:1; about 10:1 to about 30:1; about 80:1 to about 100:1; about 20:1 to about 100:1; about 20:1 to about 500:1; about 20:1 to about 1000:1; about 50:1 to about 300:1; about 50:1 to about 500:1; and about 50:1 to about 1000:1. In some embodiments, the carbon to oxygen ratio is at least about 10:1, or at least about 20:1, or at least about 35:1, or at least about 50:1, or at least about 75:1, or at least about 100:1, or at least about 200:1, or at least about 300:1, or at least about 400:1, or at least 500:1, or at least about 750:1, or at least about 1000:1; or at least about 1500:1, or at least about 2000:1. The carbon to oxygen ratio also includes all values and subvalues between these ranges.

The graphene sheets can contain atomic scale kinks. These kinks can be caused by the presence of lattice defects in, or by chemical functionalization of the two-dimensional hexagonal lattice structure of the graphite basal plane.

The coating compositions can further comprise graphite (including natural, Kish, and synthetic, annealed, pyrolytic, highly oriented pyrolytic, etc. graphites) and/or graphite oxide. The ratio by weight of graphite and/or graphite oxide to graphene sheets can be from about 2:98 to about 98:2, or from about 5:95 to about 95:5, or from about 10:90 to about 90:10, or from about 20:80 to about 80:20, or from about 30:70 to 70:30, or from about 40:60 to about 90:10, or from about 50:50 to about 85:15, or from about 60:40 to about 85:15, or from about 70:30 to about 85:15.

The amounts of graphene sheets having different C/O ratios, graphite, graphite oxide and/or other additives can be adjusted to obtain a coating having desired properties.

The graphene sheets can comprise two or more graphene powders having different particle size distributions and/or morphologies. The graphite can also comprise two or more graphite powders having different particle size distributions and/or morphologies.

When used, binders can be thermosets, thermoplastics, non-melt processable polymers, etc. Binders can also comprise monomers that can be polymerized before, during, or after the application of the coating to the substrate. Polymeric binders can be crosslinked or otherwise cured after the coating has been applied to the substrate. Examples of polymers include, but are not limited to polyolefins (such as polyethylene, linear low density polyethylene (LLDPE), low density polyethylene (LDPE), high density polyethylene, polypropylene, and olefin copolymers), styrene/butadiene rubbers (SBR), styrene/ethylene/butadiene/styrene copolymers (SEBS), butyl rubbers, ethylene/propylene copolymers (EPR), ethylene/propylene/diene monomer copolymers (EPDM), polystyrene (including high impact polystyrene), poly(vinyl acetates), ethylene/vinyl acetate copolymers (EVA), poly(vinyl alcohols), ethylene/vinyl alcohol copolymers (EVOH), poly(vinyl butyral) (PVB), poly(vinyl formal), poly(methyl methacrylate) and other acrylate polymers and copolymers (such as methyl methacrylate polymers, methacrylate copolymers, polymers derived from one or more acrylates, methacrylates, ethyl acrylates, ethyl methacrylates, butyl acrylates, butyl methacrylates, glycidyl acrylates and methacrylates and the like), olefin and styrene copolymers, acrylonitrile/butadiene/styrene (ABS), styrene/acrylonitrile polymers (SAN), styrene/maleic anhydride copolymers, isobutylene/maleic anhydride copolymers, ethylene/acrylic acid copolymers, poly(acrylonitrile), poly(vinyl acetate) and poly(vinyl acetate) copolymers, poly(vinyl pyrrolidone) and poly(vinyl pyrrolidone) copolymers, vinyl acetate and vinyl pyrrolidone copolymers, polycarbonates (PC), polyamides, polyesters, liquid crystalline polymers (LCPs), poly(lactic acid) (PLA), poly(phenylene oxide) (PPO), PPO-polyamide alloys, polysulphone (PSU), polyetherketone (PEK), polyetheretherketone (PEEK), polyimides, polyoxymethylene (POM) homo- and copolymers, polyetherimides, fluorinated ethylene propylene polymers (FEP), poly(vinyl fluoride), poly(vinylidene fluoride), poly(vinylidene chloride), and poly(vinyl chloride), polyurethanes (thermoplastic and thermosetting), aramides (such as Kevler® and Nomex®), polytetrafluoroethylene (PTFE), polysiloxanes (including polydimethylenesiloxane, dimethylsiloxane/vinylmethylsiloxane copolymers, vinyldimethylsiloxane terminated poly(dimethylsiloxane), etc.), elastomers, epoxy polymers, polyureas, alkyds, cellulosic polymers (such as nitrocellulose, ethyl cellulose, ethyl hydroxyethyl cellulose, carboxymethyl cellulose, cellulose acetate, cellulose acetate propionates, and cellulose acetate butyrates), polyethers (such as poly(ethylene oxide), poly(propylene oxide), poly(propylene glycol), oxide/propylene oxide copolymers, etc.), acrylic latex polymers, polyester acrylate oligomers and polymers, polyester diol diacrylate polymers, UV-curable resins, etc.

Examples of elastomers include, but are not limited to, polyurethanes, copolyetheresters, rubbers (including butyl rubbers and natural rubbers), styrene/butadiene copolymers, styrene/ethylene/butadiene/styrene copolymer (SEBS), polyisoprene, ethylene/propylene copolymers (EPR), ethylene/propylene/diene monomer copolymers (EPDM), polysiloxanes, and polyethers (such as poly(ethylene oxide), poly(propylene oxide), and their copolymers).

Examples of polyamides include, but are not limited to, aliphatic polyamides (such as polyamide 4,6; polyamide 6,6; polyamide 6; polyamide 11; polyamide 12; polyamide 6,9; polyamide 6,10; polyamide 6,12; polyamide 10,10; polyamide 10,12; and polyamide 12,12), alicyclic polyamides, and aromatic polyamides (such as poly(m-xylylene adipamide) (polyamide MXD, 6)) and polyterephthalamides such as poly(dodecamethylene terephthalamide) (polyamide 12, T), poly(decamethylene terephthalamide) (polyamide 10, T), poly(nonamethylene terephthalamide) (polyamide 9, T), the polyamide of hexamethylene terephthalamide and hexamethylene adipamide, the polyamide of hexamethyleneterephthalamide, and 2-methylpentamethyleneterephthalamide), etc. The polyamides may be polymers and copolymers (i.e., polyamides having at least two different repeat units) having melting points between about 120 and 255° C. including aliphatic copolyamides having a melting point of about 230° C. or less, aliphatic copolyamides having a melting point of about 210° C. or less, aliphatic copolyamides having a melting point of about 200° C. or less, aliphatic copolyamides having a melting point of about 180° C. or less, etc. Examples of these include those sold under the trade names Macromelt by Henkel and Versamid by Cognis.

Examples of acrylate polymers include those made by the polymerization of one or more acrylic acids (including acrylic acid, methacrylic acid, etc.) and their derivatives, such as esters. Examples include methyl acrylate polymers, methyl methacrylate polymers, methacrylate copolymers. Examples include polymers derived from one or more acrylates, methacrylates, acrylic acid, methacrylic acid, methyl acrylate, methyl methacrylate, ethyl acrylate, ethyl methacrylate, butyl acrylate, butyl methacrylate, glycidyl acrylate, glycidyl methacrylates, 2-ethylhexyl acrylate, 2-ethylhexyl methacrylate, hydroxyethyl acrylate, hydroxyethyl (meth)acrylate, acrylonitrile, and the like. The polymers may comprise repeat units derived from other monomers such as olefins (e.g. ethylene, propylene, etc.), vinyl acetates, vinyl alcohols, vinyl pyrrolidones, etc. They may include partially neutralized acrylate polymers and copolymers (such as ionomer resins).

Examples of polymers include Elvacite® polymers supplied by Lucite International, Inc., including Elvacite® 2009, 2010, 2013, 2014, 2016, 2028, 2042, 2045, 2046, 2550, 2552, 2614, 2669, 2697, 2776, 2823, 2895, 2927, 3001, 3003, 3004, 4018, 4021, 4026, 4028, 4044, 4059, 4400, 4075, 4060, 4102, etc. Other polymer families include Bynel® polymers (such as Bynel® 2022 supplied by DuPont) and Joncryl® polymers (such as Joncryl® 678 and 682).

Examples of polyesters include, but are not limited to, poly(butylene terephthalate) (PBT), poly(ethylene terephthalate) (PET), poly(1,3-propylene terephthalate) (PPT), poly(ethylene naphthalate) (PEN), poly(cyclohexanedimethanol terephthalate) (PCT)), etc.

The coating compositions optionally comprise one or more carriers in which some or all of the components are dissolved, suspended, or otherwise dispersed or carried. Examples of suitable carriers include, but are not limited to, water, distilled or synthetic isoparaffinic hydrocarbons (such Isopar® and Norpar® (both manufactured by Exxon) and Dowanol® (manufactured by Dow), citrus terpenes and mixtures containing citrus terpenes (such as Purogen, Electron, and Positron (all manufactured by Ecolink)), terpenes and terpene alcohols (including terpineols, including alpha-terpineol), limonene, aliphatic petroleum distillates, alcohols (such as methanol, ethanol, n-propanol, i-propanol, n-butanol, i-butanol, sec-butanol, tert-butanol, pentanols, i-amyl alcohol, hexanols, heptanols, octanols, diacetone alcohol, butyl glycol, etc.), ketones (such as acetone, methyl ethyl ketone, cyclohexanone, i-butyl ketone, 2,6,8, trimethyl-4-nonanone etc.), esters (such as methyl acetate, ethyl acetate, n-propyl acetate, i-propyl acetate, n-butyl acetate, i-butyl acetate, tert-butyl acetate, carbitol acetate, etc.), glycol ethers, ester and alcohols (such as 2-(2-ethoxyethoxy) ethanol, propylene glycol monomethyl ether and other propylene glycol ethers; ethylene glycol monobutyl ether, 2-methoxyethyl ether (diglyme), propylene glycol methyl ether (PGME); and other ethylene glycol ethers; ethylene and propylene glycol ether acetates, diethylene glycol monoethyl ether acetate, 1-methoxy-2-propanol acetate (PGMEA); and hexylene glycol (such as Hexasol™ (supplied by SpecialChem)), dibasic esters (such as dimethyl succinate, dimethyl glutarate, dimethyl adipate), dimethylsulfoxide (DMSO), 1,3-dimethyl-3,4,5,6-tetrahydro-2(1H)-pyrimidinone (DMPU), imides, amides (such as dimethylformamide (DMF), dimethylacetamide, etc.), cyclic amides (such as N-methylpyrrolidone and 2-pyrrolidone), lactones (such as beta-propiolactone, gamma-valerolactone, delta-valerolactone, gamma-butyrolactone, epsilon-caprolactone), cyclic imides (such as imidazolidinones such as N,N'-dimethylimidazolidinone (1,3-dimethyl-2-imidazolidinone)). and mixtures of two or more of the foregoing and mixtures of one or more of the foregoing with other carriers.

Solvents can be low- or non-VOC solvents, non-hazardous air pollution solvents, and non-halogenated solvents.

The graphene sheets and graphite, if present, are preferably present in the compositions in about 20 to about 98 weight percent, in about 30 to about 95 weight percent, in about 40 to about 95 weight percent, in about 50 to about 95 weight percent, and in about 70 to about 95 weight percent, based on the total amount of graphene sheets and graphite, if present, and binder, if present.

The compositions can be made using any suitable method, including wet or dry methods and batch, semi-continuous, and continuous methods.

For example, components of the coating compositions, such as one or more of the graphene sheets, graphite (if used), binders, carriers, and/or other components can be processed (e.g., milled/ground, blended, etc. by using suitable mixing, dispersing, and/or compounding techniques and apparatus, including ultrasonic devices, high-shear mixers, ball mills, attrition equipment, sandmills, two-roll mills, three-roll mills, cryogenic grinding crushers, extruders, kneaders, double planetary mixers, triple planetary mixers, high pressure homogenizers, ball mills, attrition equipment, sandmills, horizontal and vertical wet grinding mills, etc. Processing (including grinding) technologies can be wet or dry and can be continuous or discontinuous. Suitable materials for use as grinding media include metals, carbon steel, stainless steel, ceramics, stabilized ceramic media (such as yttrium stabilized zirconium oxide), PTFE, glass, tungsten carbide, etc. Methods such as these can be used to change the particle size and/or morphology of the graphite, graphene sheets, other components, and blends or two or more components.

Components can be processed together or separately and can go through multiple processing (including mixing/blending) stages, each involving one or more components (including blends).

There is no particular limitation to the way in which the graphene sheets, graphite (if used), and other components are processed and combined. For example, graphene sheets and/or graphite can be processed into given particle size distributions and/or morphologies separately and then combined for further processing with or without the presence of additional components. Unprocessed graphene sheets and/or graphite can be combined with processed graphene sheets and/or graphite and further processed with or without the presence of additional components. Processed and/or unprocessed graphene sheets and/or processed and/or unprocessed graphite can be combined with other components, such as one or more binders and then combined with processed and/or unprocessed graphene sheets and/or processed and/or unprocessed graphite. Two or more combinations of processed and/or unprocessed graphene sheets and/or processed and/or unprocessed graphite that have been combined with other components can be further combined or processed.

In one embodiment, if a multi-chain lipid is used, it is added to graphene sheets (and/or graphite if present) before processing.

After blending and/or grinding steps, additional components can be added to the compositions, including, but not limited to, thickeners, viscosity modifiers, binders, etc. The compositions can also be diluted by the addition of more carrier.

The compositions can optionally comprise one or more additional additives, such as dispersion aids (including surfactants, emulsifiers, and wetting aids), adhesion promoters, thickening agents (including clays), defoamers and antifoamers, biocides, additional fillers, flow enhancers, stabilizers, crosslinking and curing agents, etc.

Examples of dispersing aids include glycol ethers (such as poly(ethylene oxide), block copolymers derived from ethylene oxide and propylene oxide (such as those sold under the trade name Pluronic® by BASF), acetylenic diols (such as 2,5,8,11-tetramethyl-6-dodecyn-5,8-diol ethoxylate and others sold by Air Products under the trade names Surfynol® and Dynol®), salts of carboxylic acids (including alkali metal and ammonium salts), and polysiloxanes.

Examples of grinding aids include stearates (such as Al, Ca, Mg, and Zn stearates) and acetylenic diols (such as those sold by Air Products under the trade names Surfynol® and Dynol®).

Examples of adhesion promoters include titanium chelates and other titanium compounds such as titanium phosphate complexes (including butyl titanium phosphate), titanate esters, diisopropoxy titanium bis(ethyl-3-oxobutanoate, isopropoxy titanium acetylacetonate, and others sold by Johnson-Matthey Catalysts under the trade name Vertec.

Examples of thickening agents include glycol ethers (such as poly(ethylene oxide), block copolymers derived from ethylene oxide and propylene oxide (such as those sold under the trade name Pluronic® by BASF), long-chain carboxylate salts (such aluminum, calcium, zinc, etc. salts of stearates, oleats, palmitates, etc.), aluminosilicates (such as those sold under the Minex® name by Unimin Specialty Minerals and Aerosil® 9200 by Evonik Degussa), fumed silica, natural and synthetic zeolites, etc.

The compositions can optionally comprise at least one "multi-chain lipid", by which term is meant a naturally-occurring or synthetic lipid having a polar head group and at least two nonpolar tail groups connected thereto. Examples of polar head groups include oxygen-, sulfur-, and halogen-containing, phosphates, amides, ammonium groups, amino acids (including α-amino acids), saccharides, polysaccharides, esters (Including glyceryl esters), zwitterionic groups, etc.

The tail groups can be the same or different. Examples of tail groups include alkanes, alkenes, alkynes, aromatic compounds, etc. They can be hydrocarbons, functionalized hydrocarbons, etc. The tail groups can be saturated or unsaturated. They can be linear or branched. The tail groups can be derived from fatty acids, such as oleic acid, palmitic acid, stearic acid, arachidic acid, erucic acid, arachadonic acid, linoleic acid, linolenic acid, oleic acid, etc.

Examples of multi-chain lipids include, but are not limited to, lecithin and other phospholipids (such as phosphoglycerides (including phosphatidylserine, phosphatidylinositol, phosphatidylethanolamine (cephalin), and phosphatidylglycerol) and sphingomyelin); glycolipids (such as glucosyl-cerebroside); saccharolipids; sphingolipids (such as ceramides, di- and triglycerides, phosphosphingolipids, and glycosphingolipids); etc. They can be amphoteric, including zwitterionic.

The compositions can optionally comprise one or more charged organic compounds. The charged organic compound comprises at least one ionic functional group and one hydrocarbon-based chain. Examples of ionic functional groups include ammonium salts, sulfates, sulphonates, phosphates, carboxylates, etc. If two or more ionic functional groups are present, they can be of the same or different types. The compound can comprise additional functional groups, including, but not limited to hydroxyls, alkenes, alkynes, carbonyl groups (such as carboxylic acids, esters, amides, ketones, aldehydes, anhydrides, thiol, etc.), ethers, fluoro, chloro, bromo, iodo, nitriles, nitrogen containing groups, phosphorous containing groups, silicon containing groups, etc.

The compound comprises at least one hydrocarbon-based chain. The hydrocarbon-based chain can be saturated or unsaturated and can be branched or linear. It can be an alkyl group, alkenyl group, alkynyl group, etc. It need not contain only carbon and hydrogen atoms. It can be substituted with other functional groups (such as those mentioned above). Other functional groups, such as esters, ethers, amides, can be present in the length of the chain. In other words, the chain can contain two or more hydrocarbon-based segments that are connected by one or more functional groups. In one embodiment, at least one ionic functional group is located at the end of a chain.

Examples of ammonium salts include materials having the formula: $R^1R^2R^3R^4N^+X^-$, where $R^1$, $R^2$, and $R^3$, are each independently H, a hydrocarbon-based chain, an aryl-containing group, an alicyclic group; an oligomeric group, a polymeric group, etc.; where $R^4$ is a hydrocarbon-based chain having at least four carbon atoms; and where $X^-$ is an anion such as fluoride, bromide, chloride, iodide, sulfate, hydroxide, carboxylate, etc. Any of the R groups can have one or more additional ammonium groups.

Examples of R groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, $C_{21}$ to $C_{40}$ chains, etc.

Examples of quaternary ammonium salts include tetraalkylammonium salts, dialkyldimethylammonium salts, alkyltrimethylammonium salts, where the alkyl groups are one or more groups containing at least eight carbon atoms. Examples include tetradodecylammonium, tetradecyltrimethylammonium halide, hexadecyltrimethylammonium halide, didodecyldimethylammonium halide, etc.

Ammonium salts can be bis- or higher order ammonium salts, including quaternary ammonium salts. They can be salts of carboxylic acids, dicarboxylic acids, tricarboxylic acids, and higher carboxylic acids. The carboxylic acids can have be part of a hydrocarbon-based chain having at least about four linear carbon atoms. Examples include ammonium salts of octanoic acid, nonanoic acid, decanoic acid, undecanoic acid, dodecanoic acid, tridecanoic acid, tetradecanoic acid, pentadecanic acid, carboxylic acids having at least 15 carbon atoms, stearic acid, oleic acid, montanic acid, apidic acid, 1,7-heptanedioic acid, 1,8-octandioic acid, 1,9-nonanedioic acid, sebacic acid, 1,11-undecandioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, 1,19-nonadecanedioic acid, 1,20-eicosanedioic acid, dicarboxylic acids having 21 to 40 carbon atoms, etc.

Alkylol ammonium salts of carboxylic acids (including high molecular weight carboxylic acids and unsaturated carboxylic acids) can be used. Examples include EFKA 5071, an alkylol ammonium salt of a high-molecular weight carboxylic acid supplied by Ciba and BYK-ES80, an alkylolammonium salt of an unsaturated acidic carboxylic acid ester manufactured by BYK USA, Wallingford, Conn.

The charged organic compound can have a sulfur containing group such as a sulphonate, mesylate, triflate, tosylate, besylate, sulfates, sulfite, peroxomonosulfate, peroxodisulfate, pyrosulfate, dithionate, metabisulfite, dithionite, thiosulfate, tetrathionate, etc. The organic compound can also contain two or more sulfur containing groups.

Alkyl, alkenyl, and/or alkynyl sulfates and sulphonates are preferred sulfur-containing compounds. The alkyl, alkenyl, and/or alkynyl groups preferably contain at least about 8 carbon atoms, or more preferably at least about 10 carbon atoms. Examples include decylsulfate salts, dodecylsulfate salts (such as sodium 1-dodecanesulfate (SDS)), decylsulfonate salts, dodecylsulfonate salts (such as sodium 1-dodecanesulfonate (SDSO)), etc. The counter ions can be any suitable cation, such as lithium, sodium, potassium, ammonium, etc.

The charged organic compound can be present in about 1 to about 75 weight percent, in about 2 to about 70 weight percent, in about 2 to about 60 weight percent, in about 2 to about 50 weight percent, in about 5 to about 50 weight percent, in about 10 to about 50 weight percent, in about 10 to about 40 weight percent, in about 20 to about 40 weight percent, based on the total weight of charged organic compound and graphene sheets and other carbonaceous fillers, if used.

The coating compositions can optionally contain additional electrically conductive components other than the graphene sheets, such as metals (including metal alloys), conductive metal oxides, polymers, carbonaceous materials other graphene sheets and graphite, if used, metal-coated materials, etc. These components can take a variety of forms, including particles, powders, flakes, foils, needles, etc.

Examples of metals include, but are not limited to silver, copper, aluminum, platinum, palladium, nickel, chromium, gold, bronze, colloidal metals, etc. Examples of metal oxides include antimony tin oxide and indium tin oxide and materials such as fillers coated with metal oxides. Metal and metal-oxide coated materials include, but are not limited to metal coated carbon and graphite fibers, metal coated glass fibers, metal coated glass beads, metal coated ceramic materials (such as beads), etc. These materials can be coated with a variety of metals, including nickel.

Examples of electrically conductive polymers include, but are not limited to, polyacetylene, polyethylene dioxythiophene (PEDOT), poly(styrenesulfonate) (PSS), PEDOT: PSS copolymers, polythiophene and polythiophenes, poly (3-alkylthiophenes), poly(2,5-bis(3-tetradecylthiophen-2-yl)thieno[3,2-b]thiophene) (PBTTT), poly (phenylenevinylene), polypyrene, polycarbazole, polyazulene, polyazepine, polyfluororenes, polynaphthalene, polyisonaphthalene, polyaniline, polypyrrole, poly (phenylene sulfide), copolymers of one or more of the foregoing, etc., and their derivatives and copolymers. The conductive polymers can be doped or undoped. They can be doped with boron, phosphorous, iodine, etc.

Examples of carbonaceous materials include, but are not limited to, graphite (including natural, Kish, and synthetic, annealed, pyrolytic, highly oriented pyrolytic, etc. graphites), graphitized carbon, carbon black, mesoporous carbon, carbon fibers and fibrils, carbon whiskers, vapor-grown carbon nanofibers, metal coated carbon fibers, carbon nanotubes (including single- and multi-walled nanotubes), fullerenes, activated carbon, carbon fibers, expanded graphite, expandable graphite, graphite oxide, hollow carbon spheres, carbon foams, etc.

After they have been applied to the patterned substrate, if necessary, the coating compositions can be cured using any suitable technique, including drying and oven-drying (in air or another inert or reactive atmosphere), UV curing, IR curing, drying, crosslinking (including free radical crosslinking, electron beam crosslinking, etc.), thermal curing, laser curing, microwave curing or drying, sintering, and the like to form the electrode.

In some embodiments, the curing can be thermal curing and can take place at a temperature of no more than about 135° C., or no more than about 120° C., or no more than about 110° C., or no more than about 100° C., or no more than about 90° C., or no more than about 80° C., or no more than about 70° C.

The coated patterns can have conductivities of at least about $10^{-8}$ S/m. They can have a conductivities of about $10^{-6}$ S/m to about $10^5$ S/m, or of about $10^{-5}$ S/m to about $10^5$ S/m. In other embodiments of the invention, the electrodes have conductivities of at least about 0.001 S/m, of at least about 0.01 S/m, of at least about 0.1 S/m, of at least about 1 S/m, of at least about 10 S/m, of at least about 100 S/m, or at least about 1000 S/m, or at least about 10,000 S/m, or at least about 20,000 S/m, or at least about 30,000 S/m, or at least about 40,000 S/m, or at least about 50,000 S/m, or at least about 60,000 S/m, or at least about 75,000 S/m, or at least about $10^5$ S/m, or at least about $10^6$ S/m.

In some embodiments, the surface resistivities of the coated patterns can be no greater than about 500Ω/square, or no greater than about 350Ω/square, or no greater than about 200Ω/square, or no greater than about 200Ω/square, or no greater than about 150Ω/square, or no greater than about 100Ω/square, or no greater than about 75Ω/square, or no greater than about 50Ω/square, or no greater than about 30Ω/square, or no greater than about 20Ω/square, or no greater than about 10Ω/square, or no greater than about 5Ω/square, or no greater than about 1Ω/square, or no greater than about 0.1Ω/square, or no greater than about 0.01Ω/square, or no greater than about 0.001Ω/square. Conductivities and surface resistivities are typically measured after the coatings have been cured.

In some embodiments, the coated patterns can have a thermal conductivity of about 0.1 to about 50 W/(m-K), or of about 0.5 to about 30 W/(m-K), or of about 1 to about 30 W/(m-K), or of about 1 to about 20 W/(m-K), or of about 1 to about 10 W/(m-K), or of about 1 to about 5 W/(m-K), or of about 2 to about 25 W/(m-K), or of about 5 to about 25 W/(m-K).

The coating compositions can be applied to the patterned substrate using any suitable method, including those described above for the application of the pattern to the substrate. The device can be covered in whole or in part with additional material, such as overcoatings, varnishes, polymers, fabrics, etc. It can be part of a laminate or multilayered structure.

The coatings can have a variety of thicknesses. For example, the coating can optionally have a thickness of at least about 2 nm, or at least about 5 nm. In various embodiments, the coatings can optionally have a thickness of about 2 nm to 2 mm, about 5 nm to 1 mm, about 2 nm to about 100 nm, about 2 nm to about 200 nm, about 2 nm to about 500 nm, about 2 nm to about 1 micrometer, about 5 nm to about 200 nm, about 5 nm to about 500 nm, about 5 nm to about 1 micrometer, about 5 nm to about 50 micrometers, about 5 nm to about 200 micrometers, about 10 nm to about 200 nm, about 50 nm to about 500 nm, about 50 nm to about 1 micrometer, about 100 nm to about 10 micrometers, about 1 micrometer to about 2 mm, about 1 micrometer to about 1 mm, about 1 micrometer to about 500 micrometers, about 1 micrometer to about 200 micrometers, about 1 micrometer to about 100 micrometers, about 50 micrometers to about 1 mm, about 100 micrometers to about 2 mm, about 100 micrometers to about 1 mm, about 100 micrometers to about 750 micrometers, about 100 micrometers to about 500 micrometers, about 500 micrometers to about 2 mm, about 500 micrometers to about 1 mm, about 500 nm to about 100 micrometers, about 750 nm to about 50 micrometers, about 1 micrometer to about 50 micrometers, about 500 nm to about 100 micrometers, about 750 nm to about 100 micrometers, about 1 micrometer to about 100 micrometers, about 1 micrometer to about 25 micrometers, about 1 micrometer to about 13 micrometers, about 1 micrometer to about 10 micrometers, about 1 micrometer to about 8 micrometers, about 1 micrometer to about 5 micrometers, about 500 nm to about 25 micrometers, about 500 nm to about 13 micrometers, about 500 nm to about 10 micrometers, about 500 nm to about 8 micrometers, or about 500 nm to about 5 micrometers.

The security devices can be incorporated into larger structures or devices. Not all of the substrate need be coated and other areas of the substrate can have other functionality. They can be connected to electrical or electronic circuits or other electrical or electronic components. They can be used in anti-fraud, anti-tampering, anti-counterfeiting, anti-theft, tracking, forensics, authentication (including product authentication), inventory control, etc. applications.

The security devices can be used in financial applications, such as checks, money orders, banknotes, stock certificates, bearer bonds, and other instruments. They can be used in passports, drivers' licenses, and identification cards, social security cards, motor vehicle registrations, postage stamps, tax stamps, security paper, certificates of authenticity, legal documents, vital records certificates (e.g., birth, death, marriage, etc. records), automobile and land titles, permits, election documents, health records, transcripts, prescription forms, parking and mass transit passes and permits, secure letterhead, warranties and guarantees, coupons and rebates, bills of lading and other shipping documents, etc. They can be used for lottery tickets, game cards, gift cards, gift certificates, scratch-off cards, loyalty cards, phone cards, credit/debit cards, smart cards, event tickets, etc. They can be used to make documents that when copied do not contain the distinctive features of the security devices.

The security devices can contain barcode (including two- and three-dimensional barcode) information. They can contain identification information. They can used as a conductivity based barcode.

The security devices can be used in packaging, including pharmaceutical and food-related packaging applications and applications where tamper-resistant and tamper-evident packaging is needed. They can be used to secure shipments, etc. They can be used with valuables such as art, collectibles, electronics, designer goods, etc. They can be used for brand protection.

The devices can be designed to be covert and undetectable to the initiated, making tampering very difficult. They can offer two or more layers of security (such as through electrical conductivity, thermal conductivity, optical density, color coordinates, XRD patterns, variations in properties in different regions of the coated pattern, etc.). By varying how the pattern is applied to the substrate and/or how the coating is applied to the pattern, each copy of a particular item to be secured could be given a device having a signature unique to that particular copy.

EXAMPLES

An image consisting of six blocks, corresponding to about 5, 20, 40, 60, 80, and 100% gray is printed using a laser printer onto plain printer paper. The six blocks and unimaged portions of the paper sheet are overcoated with a coating comprising graphene sheets, graphite, an acrylate binder, and solvent using a #28 wire rod. The coated paper is dried at about 125° C. for about 4 minutes. The surface resistivities of each block as well portions of the paper that were not printed with toner (indicated as 0% gray) are measured using a four-point probe. The results are given in Table 1. The degree of coating adhesion to the substrate is directly proportional to the percentage gray on the image.

TABLE 1

| % Gray | Surface resistivity (Ohm/sq) |
| --- | --- |
| 0 | 20 |
| 5 | 26 |
| 20 | 30 |
| 40 | 42 |
| 60 | 57 |
| 80 | 60 |
| 100 | 67 |

The invention claimed is:

1. An article, comprising:
a first layer comprising a substrate having an image applied thereto;
a second layer applied on the image, the second layer comprising a first portion and a second portion, the first portion and the second portion in communication with a first image area of the image and a second image area of the image, respectively;
wherein the second layer comprises a coating composition comprising fully exfoliated single sheets of graphene;
wherein the first portion comprises a first detectable property having a value correlated with the fully exfoliated single sheets of graphene;
wherein the second portion comprises a second detectable property, the first detectable property not equal to the second detectable property, the second detectable property has a second value correlated with the fully exfoliated single sheets of graphene;
wherein the first detectable property comprises a first X-ray diffraction pattern and a first electrical conductivity;
wherein the second property comprises a second X-ray diffraction pattern and a second electrical conductivity; and
wherein the first detectable property and the second detectable property together create a distinctive signature for the article.

2. The article of claim 1, wherein the coating composition further comprises at least one polymer binder selected from the group consisting of acrylate polymers, epoxies, polyamides, poly(vinyl butryal), poly(vinyl pyrrolidone), poly(vinyl acetate), vinyl acetate and vinyl pyrrolidone copolymers, poly(lactic acid), cellulosic polymers, polycarbonates, polyolefins, and polysiloxanes.

3. The article of claim 1, wherein the coating composition further comprises graphite.

4. The article of claim 1, wherein
the first electrical conductivity and the second electrical conductivity property are different; and/or
the first X-ray diffraction pattern and the second X-ray diffraction pattern are different.

5. The article of claim 1, wherein the first property further comprises a first thermal conductivity and the second property further comprises a second thermal conductivity not equal to the first thermal conductivity.

6. The article of claim 1, wherein the fully exfoliated single sheets of graphene have a surface area of at least about 100 m$^2$/g.

7. The article of claim 1, wherein the fully exfoliated single sheets of graphene have a surface area of at least about 300 m$^2$/g.

8. The article of claim 1, wherein the fully exfoliated single sheets of graphene have a surface area of at least about 400 m$^2$/g.

9. The article of claim 1, wherein the fully exfoliated single sheets of graphene comprise oxygen functional groups, and wherein the individual graphene sheets have a carbon to oxygen molar ratio of at least 2000:1.

10. The article of claim 1, wherein the second layer is conductively coupled to an electronic circuit.

11. A method to enable fabrication of an article, comprising:
prepare a first composition using a first plurality of fully exfoliated single sheets of graphene, the first composition having a first detectable property, the first detectable property having a first property value associated with the first plurality of fully exfoliated single sheets of graphene;
prepare a second composition using a second plurality of fully exfoliated single sheets of graphene, the second composition comprising a second detectable property, the second detectable property having a second property value associated with the second plurality of fully exfoliated single sheets of graphene;
applying the first composition on to a first area of an image formed on a surface of a substrate;
applying the second composition on to a second area of the image; and
wherein the first property value is not equal to the second property value;
wherein the first detectable property and the second detectable property together create a distinctive signature for the article;
wherein the first detectable property comprises a first X-ray diffraction pattern and a first electrical conductivity; and
wherein the second detectable property comprises a first X-ray diffraction pattern and a first electrical conductivity.

12. The method of claim 11, wherein one or more of the first composition and the second composition further comprises graphite.

13. The method of claim 11, wherein at least one of the first composition and the second composition further comprises at least one polymer binder selected from the group consisting of an acrylate polymer, an epoxy, a polyamide, a poly(vinyl butryal), a poly(vinyl pyrrolidone), a poly(vinyl acetate), a vinyl acetate and vinyl pyrrolidone copolymer, a poly(lactic acid), a cellulosic polymer, a polycarbonate, a polyolefin, and a polysiloxanes.

14. The method of claim 11, further comprising conductively coupling at least one of the first composition and the second composition to an electronic circuit.

15. The method of claim 11, wherein at least one of the step of applying the first composition and the step of applying the second composition comprises a printing technique selected from the group consisting of flexographic printing, screen printing, spray coating, and gravure printing.

* * * * *